United States Patent Office 3,458,826

Patented July 29, 1969

3,458,826

AUTOMATIC POWER CONTROLS FOR AMPLIFIERS

Jean F. Lalande, Bagneux, and Alfred Sichel, Paris, France, assignors to C.I.T.—Compagnie Industrielle des Telecommunications, Paris, France, a corporation of France Filed May 23, 1967, Ser. No. 640,572
Int. Cl. H03f 1/30
U.S. Cl. 330—2 10 Claims

ABSTRACT OF THE DISCLOSURE

A system for controlling the energy dissipation in an amplifier connected between a signal source and a load by calculating the energy dissipation from the value of energy supplied by said amplifier to said load, the value of energy reflected from said load back to said amplifier and the value of energy supplied by the voltage source to the amplifier, and reducing the excitation level of said amplifier when the detected dissipation thereof exceeds a maximum value.

BACKGROUND OF THE INVENTION

The invention relates to a regulating device for limiting automatically the D.C. energy absorbed by a power amplifier for radio-electric waves, and more particularly a radio transmission amplifier, by preventing excessive dissipation from occurring therein.

If the impedance match between an amplifier and a load connected by a line thereto is not perfect, the load will reflect a portion of the energy travelling along the line from the amplifier to the load back towards the amplifier. It is known that under these conditions the energy $P_1$, effectively transmitted by the load is equal to the energy $P_2$ transmitted by the amplifier towards the load, less the energy $P_3$ reflected by the load back towards the amplifier, according to the equation:

$$P_1=P_2-P_3 \quad (1)$$

It is also known that a part $P_4$ of the power supplied by a source $P_0$ to the amplifier is dissipated in the amplifier, the rest of the power being the energy $P_1$ absorbed by the load according to the equation:

$$P_4=P_0-P_1 \quad (2)$$

or, according to Equation 3, obtained by combining Equations 1 and 2:

$$P_4=P_0-P_2+P_3 \quad (3)$$

It is important that the energy $P_4$, dissipated by the amplifier should not exceed the safety value W, fixed by the designer.

In a typical case, where the output circuit is suitably matched and presents to the amplifier its optimum load impedance, the dissipated energy is smaller than the safety limit, due to the control of various parameters (supply voltage, polarity, excitation, and the like). However, in the case where, for some reason, the load impedance assumes a value different than the normal value, for example, in the case of a mobile transmission amplifier, the change in the impedance of the antenna due to obstacles in the proximity, causes the reflection of the energy to rise and there may thus occur an increase in the dissipated energy $P_4$ which could exceed the permitted value. In order to protect the amplifier under these conditions, it is known to provide safety circuits which most frequently act so as to simply cut off the supply source, which causes an interruption of the transmission of the message. Such an interruption may be highly undesirable.

Known safety devices use generally the standing wave ratio as a measure in order to evaluate the mismatching rate caused by the modification of the load impedance. This criterion has an arbitrary aspect. In fact, the same value of the standing wave, corresponding to two different load impedances, may be dangerous in one case and quite irrelevant in another. Hence, the known safety device will respond in the second case, although there would be no need for response at all.

BRIEF DESCRIPTION OF THE INVENTION

The invention has the primary object of acting only in the case of danger to the amplifier to reduce without completely cutting-off the supply energy absorbed by the transmitter so as to reduce the dissipated energy below the safety level W. This is accomplished in accordance with the invention by adjusting automatically the value of the absorbed power to the maximum permissible value under all states applicable, that is to say, by observing the condition $P_4=W$, or $P_4<W$, or, more generally, $P_4\leqslant W$.

Although the invention relates to power amplifiers generally, it concerns more particularly transmitters equipped with a power amplifier of the type "Class AB or Class B or Class C," whose dissipation varies as a function of the level of excitation. This facilitates the execution considerably, because it is sufficient to lower the level of excitation of this amplifier by low-level power means, which are therefore cheap, in order to obtain the control required with regard to the energy dissipated in the amplifier.

For measuring the energy $P_2$ transmitted by the amplifier to the load and the power $P_3$ reflected from the load towards the amplifier, the invention uses an apparatus known per se, a so-called reflectometer. An apparatus of this kind, inserted into a transmission line, comprises a device for measuring a voltage between conductors, a first current-responsive coupling loop having a mutual inductance M with respect to the line providing the first current measurement, and a second loop having an inductance —M with respect to the line providing a second current measurement. By combining the currents supplied by the three above-mentioned measuring devices, one obtains at a first output terminal a signal $P_2$ proportional to the power transmitted by the generator to the load, and at a second output terminal a signal proportional to the power $P_3$ reflected by the load towards the generator.

According to the invention, an automatic control device for controlling the energy dissipated in a power amplifier supplied by a D.C. source and adapted to maintain the energy dissipated in the amplifier below a maximum value, comprises a calculating member having one output and three inputs, two inputs of which are connected to the output terminals of a reflectometer mounted between the said amplifier and its load, the third input being connected to a wattmeter circuit measuring the energy supplied by the D.C. source, wherein a threshold device has a first input connected to the said calculating device and a second input connected to a predetermined D.C. voltage, and a control member for the dissipated energy of the amplifier, whose input is connected to the output of the said threshold device. The control member may act on the alternative excitation level of the power amplifier.

In the case where the D.C. source supplies a D.C. voltage having a stabilized output, the wattmeter circuit mentioned above may be replaced by an ammeter circuit, formed by a low-value resistance mounted in the ground return of the said D.C. source, whose end remote from ground is connected to the said third input of the calculating member.

According to yet another feature of the invention, the single calculating member is replaced by two differential amplifiers in cascade, a first differential amplifier receiving at its inputs the signals coming from the reflectometer and a second differential amplifier receiving at its inputs the output signal of the said first amplifier and the above-mentioned wattmeter signal.

In the case where the device according to the invention comprises a single calculating member of the type known in the art as an "adder relay," the calculation made conforms to the Equation 3 above. In the case where the device according to the invention is equipped with two differential amplifiers in cascade, the first amplifier carries out a calculation according to Equation 1, and the second differential amplifier a calculation according to Equation 2.

The invention will be further described with reference to the accompanying drawing, in which.

DETAILED DESCRIPTION OF THE INVENTION

Figure 1:
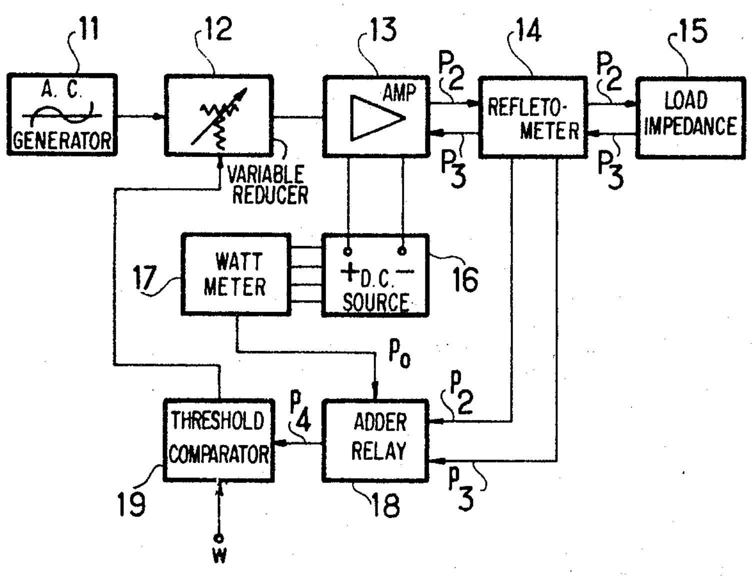
FIGURE 1 is a block diagram, showing the arrangement according to the invention in its most general form.

In FIGURE 1, an alternating generator 11 provides electronic control to an amplifier 13 via a variable reducer 12, for example, a diode reducer. The device 12 can be an amplifier with variable gain excitation by means of electronic control or other similar devices providing the required control. The power amplifier 13 acts on a load impedance 15 through a reflectometer 14 with two output terminals which supply respectively, a signal $P_2$ varying as the energy supplied by the amplifier to the load $P_2$, and a signal $P_3$, varying as the energy $P_3$ reflected towards the amplifier by the load.

The amplifier 13 is supplied by a D.C. source 16 which is connected to a wattmeter 17 which supplies a signal $P_0$, proportional to the D.C. energy $P_0$ supplied by the source 17, that is to say, absorbed by the amplifier 13. A calculating member of the "adder relay" type 18 receives at its three inputs the signal $P_0$, $P_2$, $P_3$, and supplies a signal $P_4$, equal to $P_0-P_2+P_3$, that is, according to Equation 3 above, varying with $P_4$ the energy dissipated in the amplifier 13. This member 18 applies the signal $P_4$ to the input of a threshold comparator 19 which receives at its other input a reference value W.

The member 19 can supply under certain conditions an output signal *y* which, applied to the reducer 12, reduces the excitation of the amplifier 13. The member 19 supplies a reduction signal *y* when the signal $P_4$ exceeds the reference signal W. In other words, if the energy dissipated in the amplifier, namely $P_4$, exceeds a predetermined reference value W, the excitation level at the input of the amplifier 13 is reduced sufficiently so that the energy $P_4$ assumes a new value which is lower than, or equal to, W.

Figure 2:
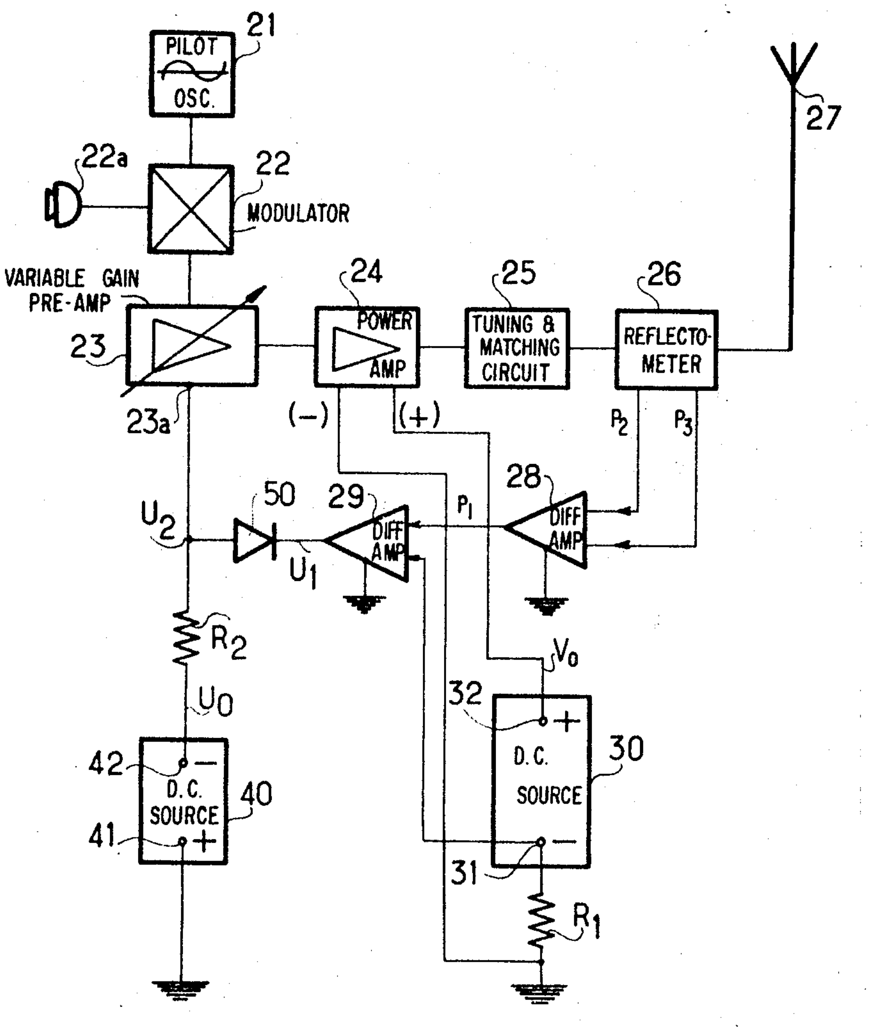
FIGURE 2 is a more detailed diagram of a particular embodiment.

FIGURE 2 shows diagrammatically the application of the invention to a transmitter comprising a pilot oscillator 21, a modulator 22, receiving at one input the output current of the oscillator and at the other input, for example, the microphonic current supplied by a microphone **22*a*. The modulated high-frequency current is amplified by a variable gain pre-amplifier 23, which excites a power amplifier 24 (Class AB, or Class B, or Class C) whose output circuit is matched to an antenna 27 by a tuning and matching circuit 25. Between the tuning and matching circuit 25 and the antenna 27 is a reflectometer 26** which supplies an output signal $P_2$ at one output, and a signal $P_3$ at another output, where $P_2$ and $P_3$ are as defined above.

The amplifier 24 is supplied with constant voltage via two terminals marked (−) and (+), respectively, by a D.C. source 30, whose negative terminal 31 is connected to ground through a resistor $R_1$ of relatively low value, and the positive terminal 32 of the source 30 is connected to the + terminal of the amplifier 24. The voltage drop V across this resistor is proportional to the current flowing therethrough, that is, to the energy $P_0$ consumed by the amplifier 24.

A first differential amplifier 28 receives at its two inputs the signals $P_2$ and $P_3$ and supplies at the output a signal $P_1$, equal to the difference $P_2-P_3$. This signal $P_1$ varies as the energy effectively transmitted to the load $P_1$, according to Equation 1 above.

A second differential amplifier 29 receives at one input the signal $P_1$ and at another input the signal V, which is equivalent to the signal $P_0$: $V=P_0$. This second differential amplifier supplies an output voltage $U_1$ which is equivalent to the signal $P_4$, mentioned above.

A battery 40 with the electromotive force $U_0$ has its positive terminal 41 connected to ground and its negative terminal 42 connected to a gain control terminal **23*a* of the preamplifier 23 across a resistor $R_2$. A voltage $U_2$ is applied to the terminal 23*a*. Between the terminal 23*a* and the output of the amplifier 29 is a diode 50 whose cathode returns to ground through the output circuit of the amplifier 29. The voltage $U_1$, obtained from the output of the amplifier 29** is equivalent to the signal $P_4$ of FIGURE 1.

For an absolute value of the voltage $U_1$ (negative) below a certain threshold, the modulus of $U_1$ is lower than the modulus of $U_2$; and the diode 50 is therefore polarized in reverse, that is, it is blocked, and the voltage $U_2$ is equal to $U_0$ because it does not pass current to the resistor $R_2$. For a modulus of $U_1$ exceeding a certain fixed value (i.e., for a value of the dissipated energy $P_4$ exceeding a predetermined threshold), $[U_1]$ becomes greater than $[U_2]$, and the diode 50 becomes conducting; the voltage $U_2$ is therefore aligned with $U_1$ under the action of a current I passing through the resistor $R_2$. The voltage $U_2$ therefore becomes more negative; and from this follows a drop in the gain of the preamplifier 23, and thus a reduction of the excitation of the power amplifier and a reduction in the energy dissipated in this amplifier. The transmission continues at reduced level and the desired result is thus obtained.

For demonstrating the advantages achieved by the invention over and above known devices, the following table shows the values of different parameters obtained from a transmitter during operation. The standing wave ratio S is equal to $1+r/1-r$, where $r=\sqrt{P_3/P_2}$, the gain of the preamplifier is designated C, and the dissipated energy not to be exceeded has been fixed at W=1500 watts. Four operating conditions are shown, namely (a), (b), (c) and (d). The power is expressed in watts, the voltage in volts, and the gain in decibels.

| | S | $P_0$ | $P_1$ | $P_2$ | $P_3$ | $P_4$ | $U_1$ | $U_2$ | O |
|---|---|---|---|---|---|---|---|---|---|
| (a)-------- | 1 | 1,900 | 1,000 | 1,000 | 0 | 900 | −5 | −6 | 20 |
| (b)-------- | 3 | 1,000 | 450 | 600 | 150 | 550 | −3 | −6 | 20 |
| (c)-------- | 3 | 2,100 | 360 | 480 | 120 | 1,740 | −9.5 | −6 | 20 |
| (d)-------- | 3 | 1,690 | 293 | 390 | 97 | 1,397 | −7.7 | −7 | 19 |

Condition (a) is normal operation. The antenna is matched, and the standing wave ratio S is unity. The diode 50 is reversely polarized. The source voltage ($U_2=U_0=-6$v.) is applied to the preamplifier 23 which has in this case a gain of 20 db.

In condition (b) the load impedance rises. It follows therefore, on the one hand, that there occurs a mismatching between the amplifier and the load which appears as a reduction of the power $P_1$ taken up by the load, passing from 1000 to 450 w., and causes a standing wave ratio S of 3, and on the hand, a reduction in the energy taken from the D.C. source, namely $P_0$, owing to the curvature of the characteristic of the power tubes, so that the peak current drops while the load impedance rises. The output voltage of the differential amplifier 29 assumes the value $U_1=3$ v.; thus the diode remains blocked, and the gain of the preamplifier 23 remains at 20 db.

For condition (c) it will be assumed that the diode 50 is disconnected from the amplifier 29, thereby suppressing the power safety control. In the present case, the standing wave ratio S has the same value as in case (b), but the load impedance has been reduced. It follows therefrom, owing to the curvature of the power tube characteristic causing an increase in the peak current, that there occurs a rise in the power $P_0$, with a dissipated power $P_4$ assuming the value of 1740 watts, which is excessive and dangerous. At the same time, $U_1$ assumes the value −9.5 v.; but since the control loop is open, no correction is made in the gain of the amplifier, which remains at 20 db.

For condition (d) the impedance conditions of the load are the same as under (c), but the loop is closed. In the state of equilibrium, the output voltage of the differential amplifier 29, $U_1$, is equal to −7.7 v. Since the diode 50 is open, the anode side carries a voltage $U_2$ which differs from $U_1$ only by the value of the elbow voltage, equal to 0.7 v. For a voltage $U_2$ equal to −7 v. the gain of the preamplifier 23 is brought to 19 db.

An arrangement of known construction, acting as a function of the standing wave ratio, would trigger off in the case (b), where the tubes are in no danger whatever with a dissipation of 550 w. However, the device according to the invention, does not respond in this instance. And yet, the device according to the invention does automatically protect the installation in the case (d) while assuring the continuation of the transmission, with a power to the antenna only reduced to 293 watt.

The control of the power absorbed by the amplifier by the action on the alternative excitation level is generally advantageous, but other methods of controlling are possible, without thereby departing from the principle of the invention. For example, a control of the screen-grid voltage of a pentode or of a tetrode, is also possible.

It is also possible to carry out the calculation by a numerical channel, using a numerical unit and analogue-numerical converters. Such an installation may be advantageous in the case where several amplifiers are centrally controlled.

We claim:

1. A system for automatically controlling the energy dissipation in an amplifier receiving energy from a D.C. source by maintaining said energy dissipation below a maximum value, comprising:

an amplifier connected between a signal source and a load, and a D.C. source connected to said amplifier for providing energizing potential thereto, first means connected between said amplifier and said load for measuring the energy supplied by the amplifier to said load and the energy reflected from said load back to said amplifier, second means connected to said D.C. source for measuring the energy supplied by said source to said amplifier, third means connected to said first and said second means for calculating the energy dissipation of said amplifier from the measurements of said first and second means, and fourth means connected to the output of said third means for reducing the signal level of the input to said amplifier from said signal source in response to detection of an energy dissipation in said amplifier above a maximum value.

2. The combination as defined in claim 1 wherein said first means consists of a reflectometer providing a first output $P_2$ proportional to the energy supplied by the amplifier to said load and a second output $P_3$ proportional to the energy reflected from said load back to said amplifier.

3. The combination as defined in claim 2 wherein said second means consists of a wattmeter circuit providing an output $P_0$ proportional to the energy supplied by said source to said amplifier.

4. The combination as defined in claim 3 wherein said third means is a calculating device providing an output $P_4=P_0-P_2+P_3$ proportional to the energy dissipation of said amplifier.

5. The combination as defined in claim 4 wherein said fourth means includes a threshold comparator connected to said calculating device and providing an output control signal in response to said output $P_4$ exceeding a threshold value, and a control member connected between said signal source and said amplifier and responsive to said control signal for reducing the excitation level of said amplifier.

6. The combination defined in claim 5 wherein said control member acts on the alternative excitation level of the power amplifier.

7. The combination as defined in claim 5 wherein said control member includes a preamplifier whose gain is varied with variation in D.C. voltage supply thereto.

8. The combination as defined in claim 3 wherein said wattmeter circuit is formed by a resistor of low value connected in the ground connection of said D.C. source.

9. The combination as defined in claim 4 wherein said caluclating device comprises two differential amplifiers connected in cascade, the first differential amplifier providing an output $P_1=P_2-P_3$ and the second differential amplifier providing an output $P_4=P_0-P_1$.

10. The combination as defined in claim 7 wherein said threshold comparator comprises a diode connected between the output of said calculating device and a D.C. supply connected to said preamplifier, said diode providing control of said preamplifier when said output $P_4$ exceed the value of said D.C. supply.

References Cited

UNITED STATES PATENTS 2,649,570 8/1953 Radcliffe ----------- 330—2 X

NATHAN KAUFMAN, Primary Examiner

U.S. Cl. X.R.

330—144